United States Patent
Oike

(10) Patent No.: US 11,333,256 B2
(45) Date of Patent: May 17, 2022

(54) VALVE MECHANISM FOR DISCHARGING FLUID FROM A VALVE PORT

(71) Applicant: TLV CO., LTD., Hyogo (JP)

(72) Inventor: Tadashi Oike, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 17/022,795

(22) Filed: Sep. 16, 2020

(65) Prior Publication Data
US 2020/0408308 A1 Dec. 31, 2020

Related U.S. Application Data

(63) Continuation of application No. PCT/JP2019/003367, filed on Jan. 31, 2019.

(30) Foreign Application Priority Data

Mar. 20, 2018 (JP) .............................. JP2018-051989

(51) Int. Cl.
| F16K 1/38 | (2006.01) |
| F16K 1/42 | (2006.01) |
| F16K 51/00 | (2006.01) |

(52) U.S. Cl.
CPC ................... *F16K 1/38* (2013.01); *F16K 1/42* (2013.01); *F16K 51/00* (2013.01)

(58) Field of Classification Search
CPC ............... F16K 1/38; F16K 1/42; F16K 51/00
See application file for complete search history.

(56) References Cited

U.S. PATENT DOCUMENTS

| 3,428,076 A | 2/1969 | Lowe et al. |
| 3,620,251 A | 11/1971 | Bowen |
| (Continued) | | |

FOREIGN PATENT DOCUMENTS

| CH | 437949 A | 6/1967 |
| DE | 3827 C | 2/1879 |
| (Continued) | | |

OTHER PUBLICATIONS

The extended European search report issued by the European Patent Office dated Mar. 12, 2021, which corresponds to European Patent Application No. 19771759.8-1015 and is related to U.S. Appl. No. 17/022,795.

(Continued)

*Primary Examiner* — Kevin L Lee
(74) *Attorney, Agent, or Firm* — Studebaker & Brackett PC

(57) ABSTRACT

A flow rate adjusting valve includes: a casing including an inlet and an outlet and also including a channel connecting the inlet and the outlet to each other; a cylindrical valve port member disposed in the channel and having a valve port penetrating the valve port member in an upstream-downstream direction; and a valve body configured to move forward and backward to the valve port from a downstream side to thereby adjust an opening degree of a downstream opening of the valve port. The valve port includes a narrowing portion whose opening diameter is smaller than an opening diameter of an upstream opening, the valve body includes a tapered portion that enters the valve port when the valve body moves forward and a flange portion disposed at a downstream end of the tapered portion and having a contact surface that is parallel to an end surface of the valve port member and is brought into surface contact with the end surface while the valve port is fully closed, and when the (Continued)

downstream opening is at a predetermined opening degree, a passage area of the fluid in the valve port is at minimum in the narrowing portion.

3 Claims, 6 Drawing Sheets

(56) References Cited

U.S. PATENT DOCUMENTS

| | | | | |
|---|---|---|---|---|
| 10,221,964 | B2* | 3/2019 | Sogao et al. | ............ F16K 1/36 |
| 2016/0018007 | A1* | 1/2016 | Eckholz | ................ F16K 47/04 |
| | | | | 251/318 |
| 2019/0107207 | A1 | 4/2019 | Oike | |

FOREIGN PATENT DOCUMENTS

| | | |
|---|---|---|
| FR | 2.225.667 A1 | 11/1974 |
| GB | 335762 A | 10/1930 |
| JP | S43-019747 Y1 | 8/1968 |
| JP | S54-55819 A | 5/1979 |
| JP | S57-156663 U | 10/1982 |
| JP | H02-186171 A | 7/1990 |
| JP | H04-111966 U | 9/1992 |
| JP | 2001-027391 A | 1/2001 |
| JP | 2001-081820 A | 3/2001 |
| JP | 2010-270900 A | 12/2010 |
| WO | 2017/051704 A1 | 3/2017 |
| WO | 2017/217123 A1 | 12/2017 |

OTHER PUBLICATIONS

International Search Report issued in PCT/JP2019/003367; dated May 7, 2019.

* cited by examiner

VALVE MECHANISM FOR DISCHARGING FLUID FROM A VALVE PORT

CROSS-REFERENCE TO RELATED APPLICATION

This is a continuation of PCT International Application PCT/JP2019/003367 filed on Jan. 31, 2019, which claims priority to Japanese Patent Application No. 2018-051989 filed on Mar. 20, 2018. The disclosures of these applications including the specifications, the drawings, and the claims are hereby incorporated by reference in their entirety.

FIELD

The present application relates to a valve mechanism that discharges a fluid such as drain or steam from a valve port, and more particularly to measures for removing foreign matter at the valve port.

BACKGROUND

A known valve mechanism discharges a fluid such as a drain or steam from a valve port. Such a valve mechanism has the problem of clogging of the valve port caused by foreign matter included in the fluid and deposited on the valve port. A technique for solving this problem is disclosed in Japanese Patent Application Publication No. 2001-27391, for example. In the technique disclosed in Japanese Patent Application Publication No. 2001-27391, a foreign matter removing member disposed in the valve port (orifice) is caused to roll by a fluid passing through the valve port to thereby automatically remove foreign matter attached and deposited on the valve port.

SUMMARY

The technique described above, however, cannot sufficiently remove especially foreign matter having a large adhesive force. In a valve mechanism in which a valve body moves forward and backward relative to a valve port to adjust the opening degree of the valve port, it is substantially difficult to dispose a foreign matter removing member in the valve port in a manner similar to the technique described above.

The technique disclosed in the present application has been made in view of the foregoing circumstances, and has an object of preventing attachment and deposition of foreign matter on a valve port and a peripheral portion of the valve port in a valve mechanism in which a valve body moves forward and backward relative to the valve port to adjust the opening degree of the valve port.

A valve mechanism according to the present application includes a casing, a cylindrical valve port member, and a valve body. The casing includes an inlet and an outlet of a fluid and also includes a channel connecting the inlet and the outlet to each other. The valve port member is disposed in the channel, and has a valve port penetrating the valve port member in an upstream-downstream direction. The valve body is configured to move forward and backward to the valve port from a downstream side to thereby adjust an opening degree of a downstream opening of the valve port. The valve port includes a narrowing portion whose opening diameter is smaller than an opening diameter of an upstream opening. The valve body includes an entering portion that enters the valve port when the valve body moves forward and also includes a flange portion, and when the downstream opening is at a predetermined opening degree, a passage area of the fluid in the valve port is at minimum in the narrowing portion. The flange portion is disposed at a downstream end of the entering portion and has a contact surface that is parallel to a downstream end surface of the valve port member and is brought into surface contact with the downstream end surface of the valve port member while the valve port is fully closed.

The valve mechanism according to the present application is capable of preventing attachment and deposition of foreign matter on the valve port and a peripheral portion of the valve port.

DESCRIPTION OF EMBODIMENTS

Embodiments of the present application will be described hereinafter with reference to the drawings. The following embodiments are merely preferred examples in nature, and are not intended to limit techniques disclosed in this application, applications of the techniques, and use of the application.

A flow rate adjusting valve 10 according to this embodiment is disposed in, for example, a steam system and is used for discharging a given amount of steam, and constitutes a valve mechanism recited in claims of the present application. The steam is an example of a fluid for which the flow rate adjusting valve 10 is used.

Figure 1:
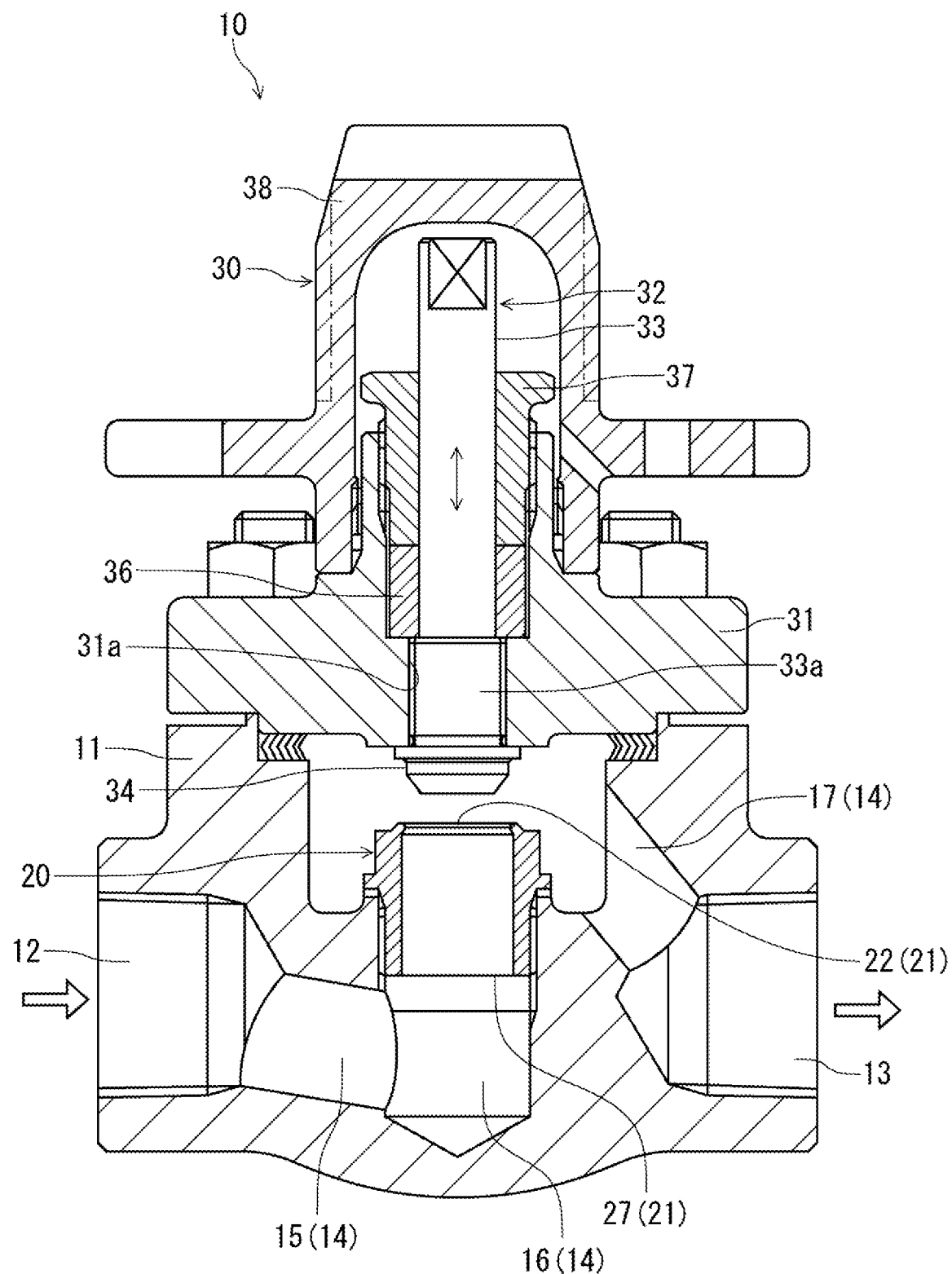
FIG. 1 is a cross-sectional view illustrating a schematic configuration of a flow rate adjusting valve (valve mechanism) according to an embodiment.

As illustrated in FIG. 1, the flow rate adjusting valve 10 according to this embodiment includes a casing 11, a valve port member 20, and a flow-rate adjusting mechanism 30.

The casing 11 includes an inlet 12 and an outlet 13 of steam, and also includes a channel 14 connecting the inlet 12 and the outlet 13 to each other. The inlet 12 and the outlet 13 are opposed to each other in an upstream-downstream direction, and has a common opening axis. The channel 14 includes an upstream passage 15, a valve port passage 16, and a downstream passage 17.

The upstream passage 15 generally extends along the opening axis, and is connected to the inlet 12. The downstream passage 17 generally extends along the opening axis and is connected to the outlet 13. The valve port passage 16 extends substantially in the radial direction about the opening axis (i.e., in the radial direction of a circle about the opening axis), and has its one end connected to the upstream passage 15 and the other end connected to the downstream passage 17. The valve port passage 16 is provided with a valve port member 20 described later.

Figure 2:
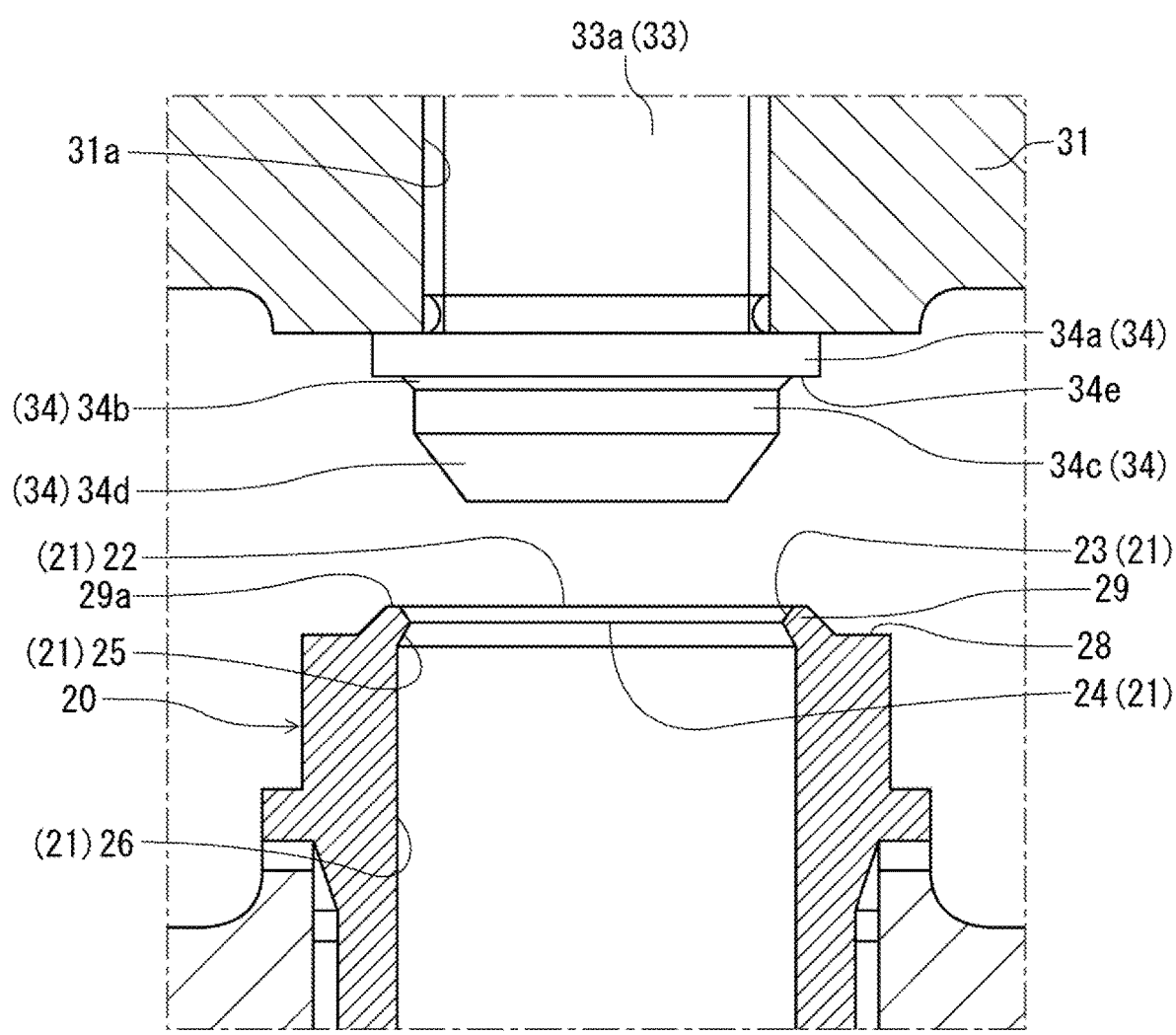
FIG. 2 is an enlarged cross-sectional view illustrating a main portion of the flow rate adjusting valve.

The valve port member 20 has a substantially cylindrical shape and is disposed in the valve port passage 16 as described above. As also illustrated in FIG. 2, the valve port member 20 is screwed and attached to a passage wall of the valve port passage 16 in the upstream-downstream direction. In FIG. 2, the top is the downstream side and the bottom is the upstream side. A valve port 21 is formed at the center of the valve port member 20 and penetrates the valve port member 20 in the upstream-downstream direction. The valve port member 20 has a projection 29 formed at the center of a downstream end surface 28. The projection 29 is formed of a portion of the downstream end surface 28 located around the valve port 21 and projecting downstream. That is, an end surface 29a of the projection 29 is an opening surface of the valve port 21 that is a flat surface, and constitutes a part of the downstream end surface 28. The valve port 21 will be described later in detail.

The flow-rate adjusting mechanism 30 adjusts a discharge flow rate of steam in the flow rate adjusting valve 10. The flow-rate adjusting mechanism 30 is attached to an outer peripheral wall of the casing 11 where an outer end of the valve port passage 16 is located, that is, to an outer peripheral wall of the casing 11 facing the valve port member 20. The flow-rate adjusting mechanism 30 includes a holding member 31, a valve member 32, and a cap 38.

The holding member 31 holds the valve member 32 and is screwed and joined to the outer peripheral wall of the casing 11. The valve member 32 includes a main shaft portion 33 and a valve body 34. The main shaft portion 33 has a circular rod shape in cross section and is disposed coaxially with the valve port 21 (valve port member 20) at a position facing the valve port 21. The main shaft portion 33 is held while being screwed to a screw hole 31a of the holding member 31. Specifically, a lower end portion (an end toward the valve port 21) of the main shaft portion 33 serves as a screw portion 33a whose outer peripheral surface is provided with an external thread, and the screw portion 33a is screwed to the screw hole 31a of the holding member 31. The valve body 34 is continuous to the lower end of the main shaft portion 33. The valve body 34 will be described later in detail. A gland packing 36 for sealing a gap between the holding member 31 and the main shaft portion 33 of the valve member 32 is mounted by a retaining member 37 on a portion of the holding member 31 above the screw hole 31a. A cap 38 covering the upper end portion of the valve member 32 and the retaining member 37 is screwed to the holding member 31.

The flow-rate adjusting mechanism 30 is configured such that the valve body 34 (valve member 32) is disposed downstream of the valve port 21 and moves forward and backward relative to the valve port 21 by rotating the valve member 32 (main shaft portion 33) so as to adjust the opening degree of a downstream opening 22 in the valve port 21. With this adjustment of the opening degree of the valve port 21, the discharge flow rate of stream in the valve port 21 is adjusted. Specifically, the main shaft portion 33 is moved (displaced) along the arrows illustrated in FIG. 1 by rotating the main shaft portion 33. Accordingly, the valve body 34 moves forward and backward relative to the valve port 21. When the valve body 34 moves forward to enter the valve port 21, the opening area (opening degree) of the downstream opening 22 of the valve port 21 decreases so that the discharge flow rate of steam decreases.

<Configurations of Valve Port and Valve Body>

As illustrated in FIG. 2, the valve port 21 includes the downstream opening 22, a tapered portion 23, a narrowing portion 24, a tapered portion 25, a cylindrical columnar portion 26, and an upstream opening 27. These members such as the downstream opening 22 and the tapered portion 23 are continuous and sequentially arranged in this order from the downstream side. The downstream opening 22 is an opening at the downstream end of the valve port 21, and is formed in the end surface 29a of the projection 29. The narrowing portion 24 has an opening diameter smaller than that of the upstream opening 27. The narrowing portion 24 is a portion where the opening diameter is at minimum in the valve port 21. The tapered portion 23 is continuous to the downstream opening 22 and the narrowing portion 24, and the opening diameter of the tapered portion 23 gradually increases from the narrowing portion 24 to the downstream opening 22. The tapered portion 25 is continuous to the narrowing portion 24, and the opening diameter of the tapered portion 25 gradually increases toward the upstream side. The cylindrical columnar portion 26 is continuous to the upstream end of the tapered portion 25 and the upstream opening 27, and has a uniform opening diameter.

The valve body 34 includes a flange portion 34a, a tapered portion 34b, a cylindrical columnar portion 34c, and a tapered portion 34d that are continuous and arranged in this order from the main shaft portion 33. The flange portion 34a is a circular disc member having an outer diameter larger than that of the main shaft portion 33. The flange portion 34a has an outer diameter larger than the opening diameter of the downstream opening 22 of the valve port 21 and larger than the outer diameter of the projection 29 of the valve port member 20.

Figure 3:
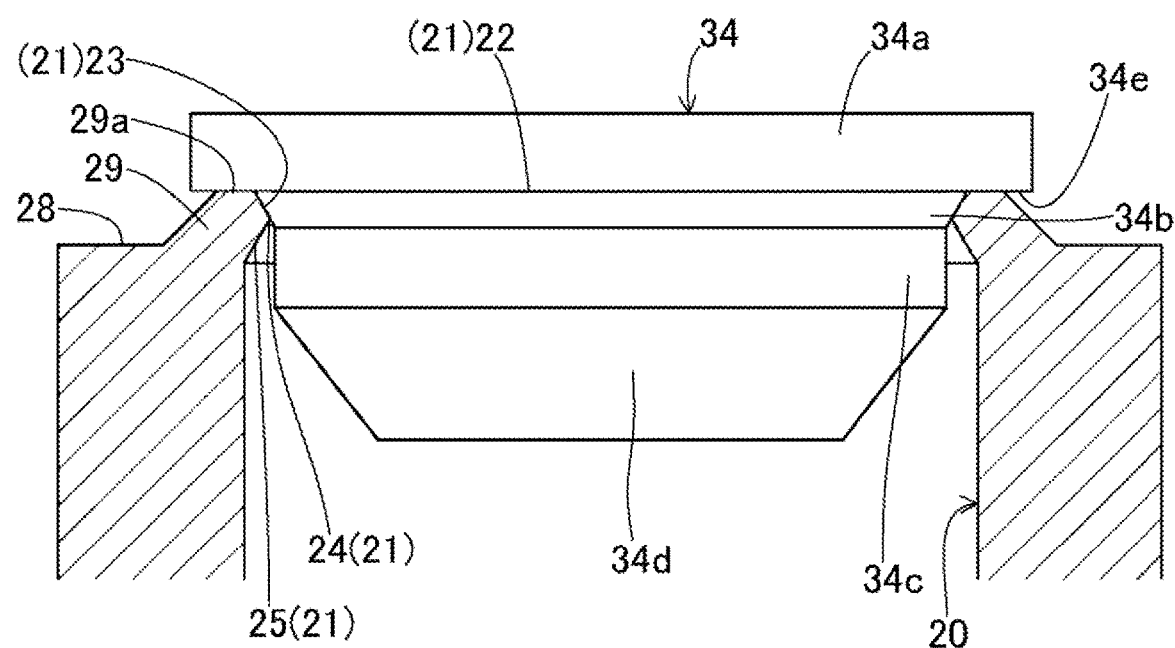
FIG. 3 is a cross-sectional view illustrating a state of a valve port according to the embodiment in a fully closed state.

The tapered portion 34b, the cylindrical columnar portion 34c, and the tapered portion 34d constitute an entering portion that enters the valve port 21 when the valve body 34 moves forward. The tapered portion 34b extends upstream from the upstream side surface of the flange portion 34a, and the outer diameter of the tapered portion 34b gradually decreases to the upstream side. As illustrated in FIG. 3, the tapered portion 34b enters the valve port 21, and is brought into surface contact with the tapered portion 23 of the valve port 21 to close the downstream opening 22. That is, in the valve port 21, the tapered portion 23 serves as a seat portion. The tapered portion 34b has a length (length in the axial direction of the valve port 21) projecting downstream from the narrowing portion 24 while being in surface contact with the tapered portion 23 of the valve port 21. When the tapered portion 34b of the valve body 34 is brought into surface contact with the tapered portion 23 of the valve port 21 as described above, the downstream opening 22 (valve port 21) becomes fully closed.

The cylindrical columnar portion 34c extends upstream from the upstream end of the tapered portion 34b, and the outer diameter of the cylindrical columnar portion 34c is equal to that of the upstream end of the tapered portion 34b. That is, the cylindrical columnar portion 34c is a portion whose outer diameter is uniform in the axial direction. The tapered portion 34d extends upstream from the upstream end of the cylindrical columnar portion 34c, and the outer diameter of the tapered portion 34d gradually decreases upstream. The tapered portion 34d is longer than each of the tapered portion 34b and the cylindrical columnar portion 34c.

An upstream side surface of the flange portion 34a is a contact surface 34e. The contact surface 34e of the flange portion 34a is a flat surface parallel to the end surface 29a (downstream end surface 28) of the projection 29 of the valve port member 20. The contact surface 34e of the flange portion 34a is a portion that is in surface contact with the end surface 29a (downstream end surface 28) of the projection 29 while the valve port 21 is fully closed. Each of the end surface 29a of the valve port member 20 and the contact surface 34e of the flange portion 34a is orthogonal to the direction in which valve body 34 moves forward and backward.

Figure 4:
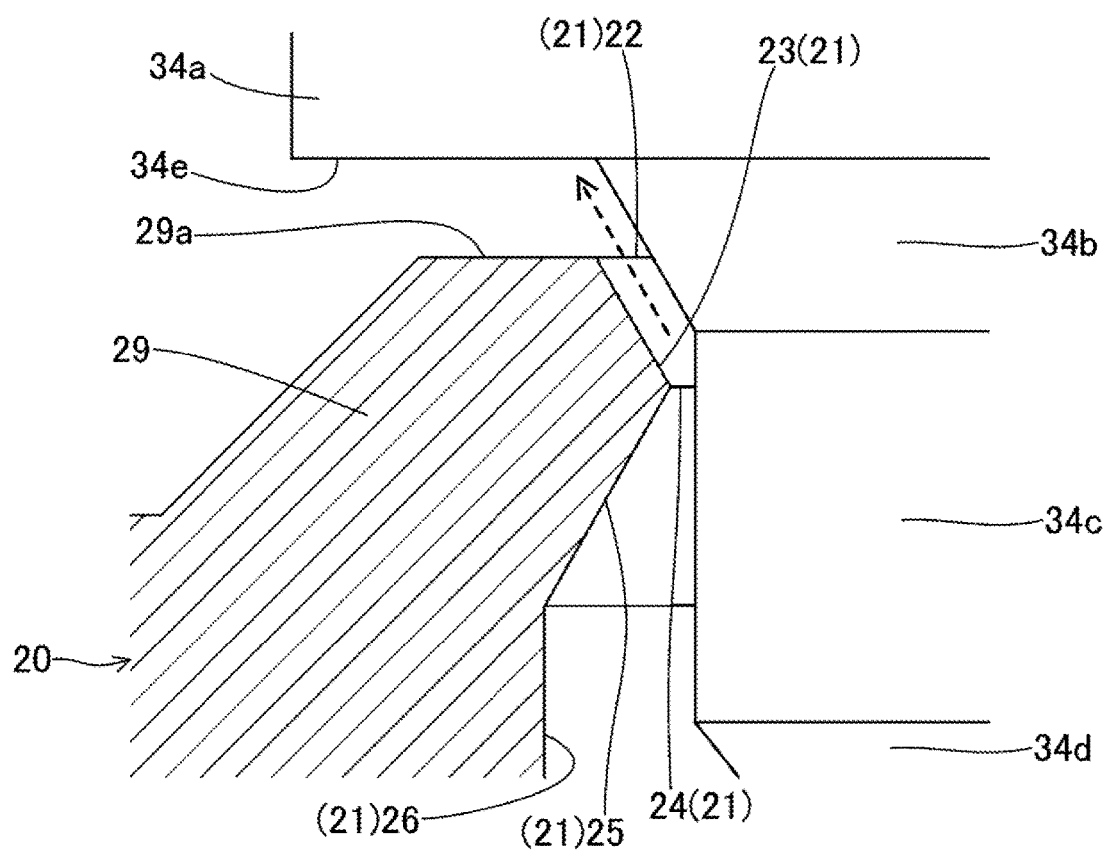
FIG. 4 is a cross-sectional view illustrating a state of the valve port according to the embodiment at a minute opening degree.

As illustrated in FIG. 4, the valve port 21 and the valve body 34 are configured such that when the downstream opening 22 is at a predetermined minute opening degree, an area of the valve port 21 through which steam passes is at minimum in the narrowing portion 24. FIG. 4 illustrates a state where the valve body 34 (valve member 32) has slightly moved backward (moved upward) from the fully closed state. FIGS. 3 and 4 do not show the main shaft portion 33 of the valve member 32. That is, since the cylindrical columnar portion 34c is formed upstream of the tapered portion 34b in the valve body 34, even when the valve body 34 slightly moves backward, a gap between the narrowing portion 24 and the valve body 34 (i.e., the area through which steam passes) can be minimized. While the downstream opening 22 (valve port 21) is fully open, the valve body 34 moves backward until the flange portion 34a contacts the bottom surface of the holding member 31 (the state illustrated in FIG. 1).

In the flow rate adjusting valve 10, high-temperature and high-pressure steam that has entered from the inlet 12 sequentially flows in the upstream passage 15 and the valve port passage 16 in this order. The steam that has flowed through the valve port passage 16 is discharged outward from the outlet 13 through the valve port 21. While the steam passes through the valve port 21, the flow rate of discharge of the steam is restricted to a flow rate in accordance with the opening area (opening degree) of the downstream opening 22.

Here, while steam passes through the valve port 21, foreign matter included in the steam might remain near the downstream opening 22 of the valve port 21. In the flow rate adjusting valve 10 according to this embodiment, in normal operation, the downstream opening 22 of the valve port 21 is set at the predetermined opening degree described above. Since the area through which steam passes is at minimum in the narrowing portion 24 in the valve port 21, the flow velocity of the inflow steam is at maximum at the narrowing portion 24. The contact surface 34e of the flange portion 34a is slightly separated from the end surface 29a (downstream end surface 28) of the valve port member 20 and is located near the downstream opening 22. Steam that has passed through the narrowing portion 24 flows in the tapered portion 23 and flows out from the downstream opening 22 toward the contact surface 34e of the flange portion 34a (see the broken arrow in FIG. 4). Thus, steam at high flow velocity hits the contact surface 34e. The steam that has hit the contact surface 34e then flows while alternately hitting the end surface 29a and the contact surface 34e. In this manner, steam at high flow velocity flows out of the downstream opening 22 and hits the contact surface 34e and the end surface 29a. Accordingly, foreign matter remaining at the downstream opening 22, the contact surface 34e, and the end surface 29a is caused to flow downstream together with steam.

At the predetermined minute opening degree described above, the tapered portion 34b of the valve body 34 is slightly separated from the tapered portion 23 of the valve port 21 and is located in parallel with the tapered portion 23. The area of a passage formed between the tapered portion 23 of the valve port 21 and the tapered portion 34b of the valve body 34 is larger than the passage area of the narrowing portion 24, but is kept significantly smaller than the passage area of each of the cylindrical columnar portion 34c of the valve port 21 and the upstream opening 27. Accordingly, while passing through the tapered portion 23, steam flows without a significant decrease in flow velocity. That is, a fluid force of steam flowing in the tapered portion 23 is substantially maintained.

In addition, the contact surface 34e is slightly separated from the end surface 29a and is located in parallel with the end surface 29a. The area of a passage formed between the contact surface 34e and the end surface 29a is larger than the passage area of the narrowing portion 24, but is kept significantly smaller than the passage area of each of the cylindrical columnar portion 34c of the valve port 21 and the upstream opening 27. Accordingly, while passing through a gap between the contact surface 34e and the end surface 29a, steam also flows without a significant decrease in flow velocity.

As described above, the flow rate adjusting valve 10 according to this embodiment is configured such that the narrowing portion 24 is provided in the valve port 21, and when the downstream opening 22 of the valve port 21 is at the predetermined opening degree (predetermined minute opening degree), the area of the valve port 21 through which steam passes is at minimum in the narrowing portion 24. The valve body 34 includes: the entering portion (i.e., the tapered portion 34b, the cylindrical columnar portion 34c, and the tapered portion 34d) that enters the valve port 21 when the valve body 34 moves forward; and the flange portion 34a formed at the downstream end of the entering portion and having the contact surface 34e that is located in parallel with the end surface 29a (downstream end surface 28) of the valve port member 20 and is brought into surface contact with the end surface 29a while the valve port 21 is fully closed. Thus, the flow velocity of steam can be made maximum in the narrowing portion 24, and the steam at the high flow velocity is caused to flow out of the downstream opening 22 and to hit the contact surface 34e of the flange portion 34a and the end surface 29a of the valve port member 20. Accordingly, foreign matter remaining at the downstream opening 22, the contact surface 34e, and the end surface 29a can be caused to flow downstream together with steam. As a result, it is possible to prevent attachment and deposition of foreign matter on the valve port 21 and peripheral portions of the valve port 21, that is, the end surface 29a and the flange portion 34a.

The valve port 21 has the tapered portion 23 whose opening diameter gradually increases from the narrowing portion 24 to the downstream opening 22. The valve body 34 has the tapered portion 34b that is separated from the tapered portion 23 while the downstream opening 22 is at the predetermined opening degree (predetermined minute opening degree) and is located in parallel with the tapered portion 23. With this configuration, while steam passes through the tapered portion 23 from the narrowing portion 24, the steam can be caused to flow without a significant decrease in flow velocity. That is, while a fluid force of steam is substantially maintained, the steam is caused to flow out of the downstream opening 22 and to hit, for example, the contact surface 34e of the flange portion 34a. Accordingly, foreign matter remaining at the downstream opening 22, the contact surface 34e, and the end surface 29a can be caused to flow downstream effectively together with steam.

The end surface 29a (downstream end surface 28) of the valve port member 20 and the contact surface 34e of the flange portion 34a are orthogonal to a direction in which valve body 34 moves forward and backward (i.e., the opening axis of the valve port 21). Thus, as in this embodiment, in the case where the opening diameter of the tapered portion 23 of the valve port 21 gradually increases from the narrowing portion 24 to the downstream opening 22, a component of a force generated by hitting of steam against the contact surface 34e and acting in the flow direction of the steam can be increased. As a result, foreign matter remaining on the contact surface 34e and the end surface 29a can be caused to flow efficiently together with steam.

The tapered portion 34b in the valve body 34 projects downstream from the narrowing portion 24 in the state where the tapered portion 34b is in surface contact with the tapered portion 23 of the valve port 21. In addition, the valve body 34 further includes the cylindrical columnar portion 34c whose outer diameter is equal to that of the downstream end of the tapered portion 34b and extends downstream from the downstream end of the tapered portion 34b. With this configuration, in a state where the valve body 34 slightly moves backward and the downstream opening 22 is set at a minute opening degree, a gap (i.e., the area through which steam passes) can be formed between the narrowing portion 24 and the cylindrical columnar portion 34c (valve body 34), and the size of this gap can be minimized Thus, the range of adjustment of the opening degree of the downstream opening 22 can be enlarged.

In this embodiment, even if foreign matter is attached and deposited on the end surface 29a of the projection 29, the valve body 34 is moved forward and the contact surface 34a of the flange portion 34a is moved to be brought into surface contact with the end surface 29a of the projection 29 (i.e., is made in a fully closed state). Accordingly, the foreign matter deposited on the end surface 29a can be crushed by the flange portion 34a. Since the projection 29 protrudes in the valve port member 20, the crushed foreign matter flows to the surroundings from the projection 29. In this manner, foreign matter can be removed from the end surface 29a.

Other Embodiments

Figure 5:
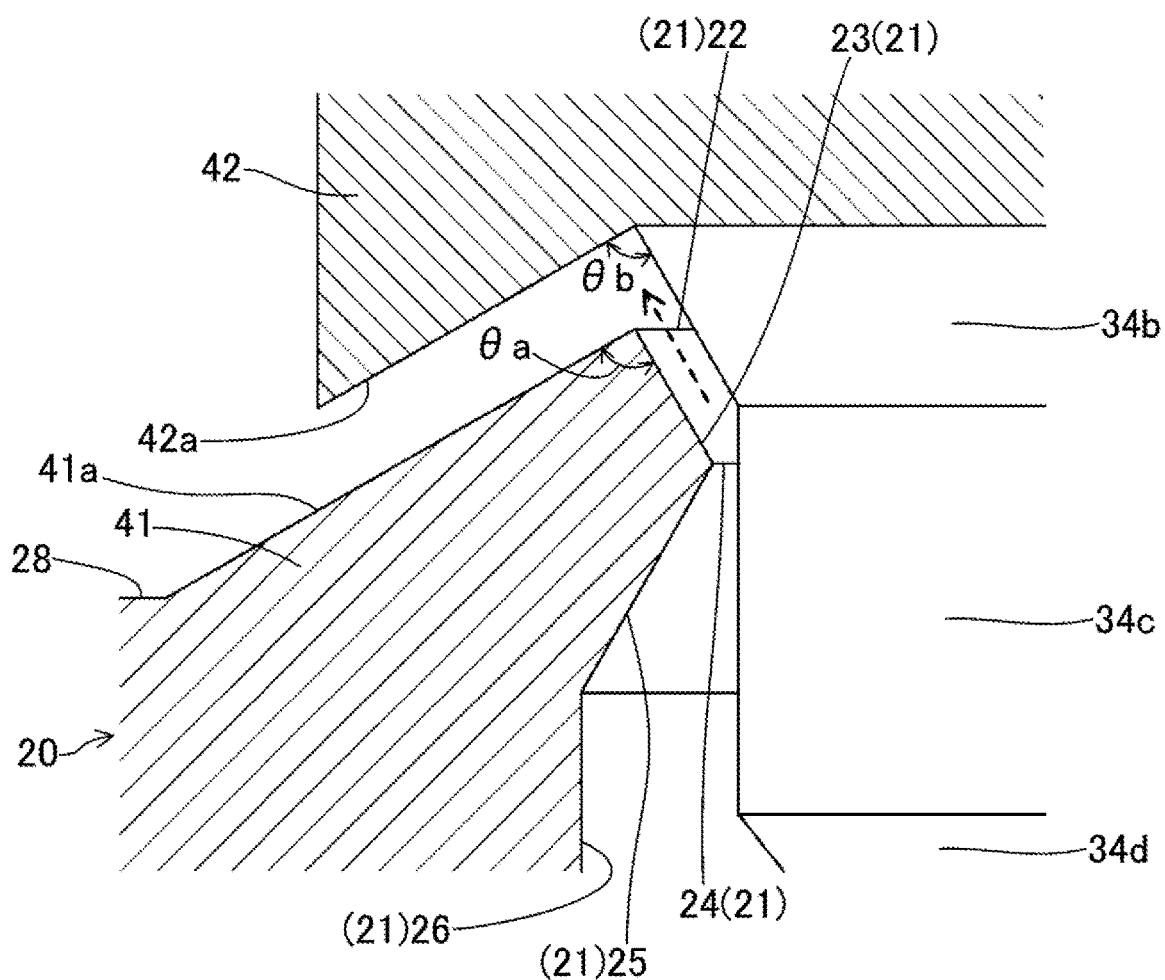
FIG. 5 is a cross-sectional view illustrating a state of a valve port according to another embodiment in a fully closed state.

In the flow rate adjusting valve 10 according to the embodiment described above, the configurations of the valve port and the valve body may be changed as follows. For example, as illustrated in FIG. 5, in this embodiment, the configurations of the contact surface of the flange portion and the end surface of the projection may be changed. Specifically, the contact surface 42a of the flange portion 42 of the valve body 34 is tilted upstream from the direction orthogonal to the direction in which the valve body 34 moves forward and backward. In the valve port member 20, the end surface of the projection 41 is formed on the tilt surface 41a tilted upstream from the direction orthogonal to the direction in which the valve body 34 moves forward and backward in conformity with the contact surface 42a (to constitute a part of the downstream end surface 28). That is, the contact surface 42a and the tilt surface 41a are parallel to each other. In addition, in the valve port member 20, an angle θa formed by the tilt surface 41a and the tapered portion 23 is a right angle (90 degrees). Similarly, in the valve body 34, an angle θb formed by the contact surface 42a and the tapered portion 34b is also a right angle.

With the configuration described above, it is possible to cause steam to hit the contact surface 42a from the downstream opening 22 at a right angle (see the broken arrow in FIG. 5). Thus, a force generated by hitting of steam against the contact surface 42a can be increased, and foreign matter remaining on the contact surface 42a and the tilt surface 41a can be caused to flow downward effectively together with steam.

Figure 6:
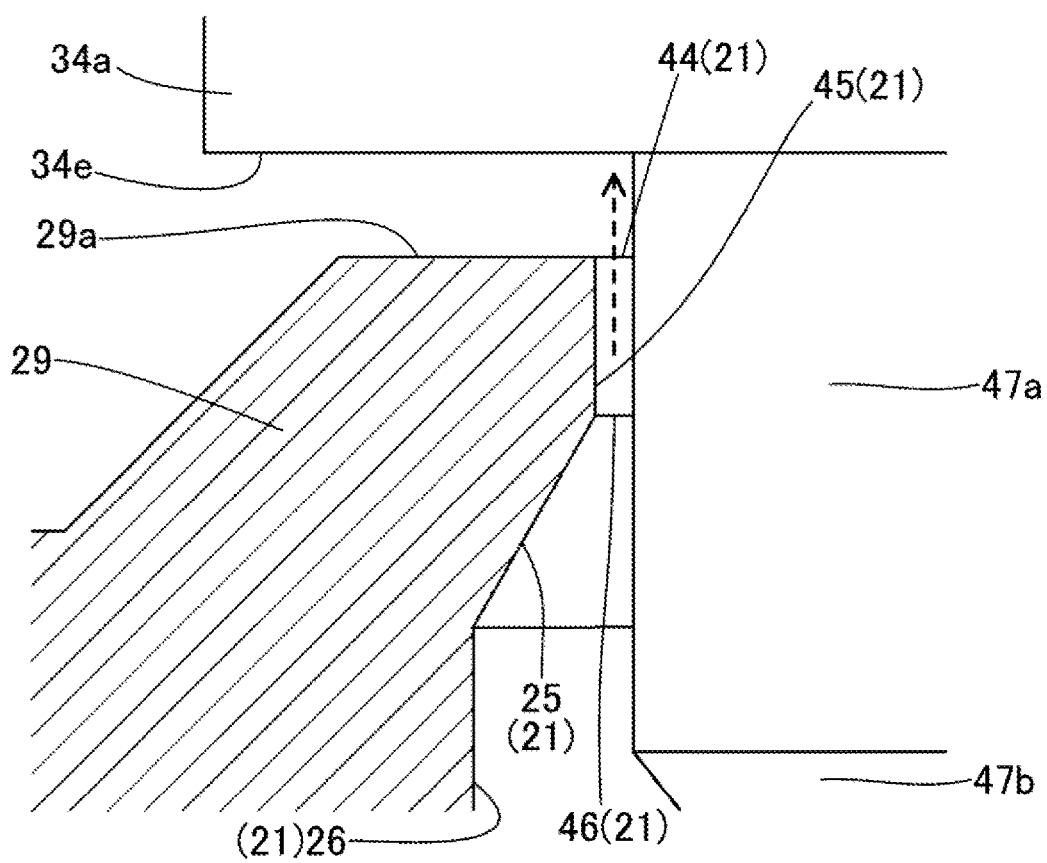
FIG. 6 is a cross-sectional view illustrating a state of a valve port according to yet another embodiment in a fully closed state.

In this embodiment, the valve port 21 has the tapered portion whose opening diameter gradually increases from the narrowing portion to the downstream opening. Alternatively, as illustrated in FIG. 6, the valve port 21 may include a cylindrical columnar portion 45 whose opening diameter is uniform from the narrowing portion 46 to the downstream opening 44. In this case, the entering portion of the valve body 34 has a cylindrical columnar portion 47a instead of the tapered portion. That is, the valve body 34 in this case has the flange portion 34a, the cylindrical columnar portion 47a, and a tapered portion 47b. The cylindrical columnar portion 47a is continuous to the upstream side surface of the flange portion 34a. The tapered portion 47b is continuous to the upstream end of the cylindrical columnar portion 47a, and the outer diameter of the tapered portion 47b gradually decreases toward the upstream side. The cylindrical columnar portion 47a is configured such that when the downstream opening 44 is at the predetermined opening degree (predetermined minute opening degree), the cylindrical columnar portion 47a is separated from the cylindrical columnar portion 45 of the valve port 21 and is located in parallel with the cylindrical columnar portion 45. In this example, it is also possible to cause steam to hit the contact surface 34e at a right angle from the downstream opening 44 (see the broken arrow in FIG. 6). Thus, a force generated by hitting of steam against the contact surface 34e can be increased.

In the foregoing description, a target fluid of the flow rate adjusting valve 10 according to this embodiment is steam. However, the technique disclosed in the present application is not limited to this example, and the target fluid may be drain, for example.

The technique disclosed in the present application is useful for a valve mechanism including a valve port and configured to discharge a fluid from the valve port.

What is claimed is:

1. A valve mechanism comprising:
   a casing including an inlet and an outlet of a fluid and also including a channel connecting the inlet and the outlet to each other;
   a cylindrical valve port member disposed in the channel and having a valve port, the valve port penetrating the valve port member in an upstream-downstream direction; and
   a valve body configured to move forward and backward to the valve port from a downstream side to thereby adjust an opening degree of a downstream opening of the valve port, wherein
   the valve port includes
      a narrowing portion whose opening diameter is smaller than an opening diameter of an upstream opening, and
      a first tapered portion whose opening diameter gradually increases from the narrowing portion to the downstream opening,
   the valve body includes
      an entering portion that enters the valve port when the valve body moves forward,
      a second tapered portion that is separated from the first tapered portion and located in parallel with the first tapered portion while the downstream opening is at the predetermined opening degree, and
      a flange portion disposed at a downstream end of the entering portion and a downstream end of the second tapered portion and having a contact surface that is parallel to a downstream end surface of the valve port member and is brought into surface contact with the downstream end surface of the valve port member while the valve port is fully closed, and when the downstream opening is at a predetermined opening degree, a passage area of the fluid in the valve port is at minimum in the narrowing portion, wherein the flange portion is disposed at a downstream end of the tapered portion, and the downstream end surface of the valve port member and the contact surface of the flange portion are orthogonal to a direction in which the valve body moves forward and backward.

2. The valve mechanism according to claim 1, wherein the tapered portion of the valve body is configured to be brought into surface contact with the tapered portion of the valve port to thereby close the downstream opening, and projects upstream from the narrowing portion while being in contact with the tapered portion of the valve port.

3. The valve mechanism according to claim 2, wherein the valve body includes a cylindrical columnar portion whose outer diameter is equal to a diameter of an upstream end of the tapered portion of the valve body, and the cylindrical columnar portion extends upstream from the upstream end.

\* \* \* \* \*